(12) United States Patent
Bacinschi et al.

(10) Patent No.: US 11,576,021 B2
(45) Date of Patent: Feb. 7, 2023

(54) DATA PROCESSING SYSTEM FOR DETECTING EVENTS AND PROVIDING NOTIFICATIONS

(71) Applicant: SAP SE, Walldorf (DE)

(72) Inventors: Radim Bacinschi, Vancouver (CA); Ian McAlpine, North Vancouver (CA); Edward Yan, Richmond (CA)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 16/900,822

(22) Filed: Jun. 12, 2020

(65) Prior Publication Data

US 2021/0297833 A1 Sep. 23, 2021

Related U.S. Application Data

(60) Provisional application No. 62/993,545, filed on Mar. 23, 2020.

(51) Int. Cl.
| | |
|---|---|
| *H04W 4/60* | (2018.01) |
| *H04Q 9/00* | (2006.01) |
| *H04L 67/12* | (2022.01) |
| *H04W 4/024* | (2018.01) |
| *H04W 4/33* | (2018.01) |
| *H04W 8/18* | (2009.01) |
| *G08B 7/06* | (2006.01) |
| *G16Y 20/10* | (2020.01) |
| *G16Y 10/80* | (2020.01) |
| *G16Y 40/10* | (2020.01) |
| *G16Y 40/50* | (2020.01) |
| *G06Q 90/00* | (2006.01) |
| *G08B 17/06* | (2006.01) |

(52) U.S. Cl.
CPC ............ *H04W 4/60* (2018.02); *G06Q 90/205* (2013.01); *G08B 7/062* (2013.01); *G08B 17/06* (2013.01); *G16Y 10/80* (2020.01); *G16Y 20/10* (2020.01); *G16Y 40/10* (2020.01); *G16Y 40/50* (2020.01); *H04L 67/12* (2013.01); *H04Q 9/00* (2013.01); *H04W 4/024* (2018.02); *H04W 4/33* (2018.02); *H04W 8/18* (2013.01); *H04Q 2209/823* (2013.01)

(58) Field of Classification Search
CPC ......... H04W 4/60; H04W 4/024; H04W 4/33; H04W 8/18; G16Y 20/10; G16Y 10/80; G16Y 40/10; G16Y 40/50; G06Q 90/205; G08B 17/06; G08B 7/062; H04Q 9/00; H04Q 2209/823; H04L 67/12
USPC ...................................................... 340/870.16
See application file for complete search history.

(56) References Cited

U.S. PATENT DOCUMENTS

2009/0043504 A1* 2/2009 Bandyopadhyay .... G01C 17/38
701/469
2015/0287295 A1 10/2015 Trivelpiece et al.
(Continued)

*Primary Examiner* — Hirdepal Singh
(74) *Attorney, Agent, or Firm* — Fountainhead Law Group P.C.

(57) ABSTRACT

Some embodiments provide a non-transitory machine-readable medium that stores a program. The program receives a set of sensor data from a set of sensors. Each sensor in the set of sensors is configured to sense a physical quantity. Based on the set of sensor data, the program further determines that a particular event has occurred. Based on the determination that the particular event has occurred, the program also sends a set of notifications to a set of subscribers.

20 Claims, 12 Drawing Sheets

(56) References Cited

U.S. PATENT DOCUMENTS

| | | | |
|---|---|---|---|
| 2019/0266860 A1* | 8/2019 | Lakshmipathy | G06K 9/00362 |
| 2020/0225313 A1* | 7/2020 | Coles | G08B 13/1672 |
| 2020/0410828 A1* | 12/2020 | Wedig | G08B 7/066 |
| 2021/0158666 A1* | 5/2021 | Derickson | G08B 7/062 |
| 2021/0241595 A1* | 8/2021 | Young | G08B 17/00 |

* cited by examiner

300

| Sensor 1 | Sensor 2 | Sensor 3 |
|---|---|---|
| Fire | No fire | No fire |

| Sensor 1 | Sensor 2 | Sensor 3 |
|---|---|---|
| Fire | No fire | Fire |

| Sensor 1 | Sensor 2 | Sensor 3 | SD 1 | SD 2 | SD 3 |
|---|---|---|---|---|---|
| No fire | No fire | No fire | Green | Green | Green |
| Fire | No fire | No fire | Red | Green | Green |
| No fire | Fire | No fire | Green | Red | Green |
| No fire | No fire | Fire | Green | Green | Red |
| Fire | Fire | No fire | Red | Red | Green |
| No fire | Fire | Fire | Green | Red | Red |
| Fire | No fire | Fire | Red | Green | Red |
| Fire | Fire | Fire | Red | Red | Green |

| Sensor 1 | Sensor 2 | Sensor 3 |
|---|---|---|
| No fire | No fire | No fire |

| Sensor 1 | Sensor 2 | Sensor 3 |
|---|---|---|
| No fire | Fire | No fire |

FIG. 7B

DATA PROCESSING SYSTEM FOR DETECTING EVENTS AND PROVIDING NOTIFICATIONS

CROSS-REFERENCE TO RELATED APPLICATION

The present application claims the benefit and priority of U.S. Provisional Application No. 62/993,545, filed Mar. 23, 2020, entitled "Smart Emergency Devices and Real-time Notifications for Emergency Devices," the entire contents of which are incorporated herein by reference in its entirety for all purposes.

BACKGROUND

Smart devices are electronic devices that can be configured to connect to other devices or networks through a variety of communication protocols (e.g., Bluetooth, NFC, Wi-Fi, 4G, etc.). Such devices may operate interactively and autonomously. Examples of smart devices include smartphones, smart cars, smart thermostats, smart doorbells, smart locks, smart refrigerators, phablets and tablets, smartwatches, smart glasses, smart bands, smart key chains, smart speakers, etc. In some cases, a smart device is an electronic device that has the following properties: (1) the device is networked, distributed and transparently accessible; (2) the device hides human-computer interactions from users; and (3) the device has context awareness of an environment.

SUMMARY

In some embodiments, a non-transitory machine-readable medium stores a program executable by at least one processing unit of a device. The program receives a set of sensor data from a set of sensors. Each sensor in the set of sensors is configured to sense a physical quantity. Based on the set of sensor data, the program further determines that a particular event has occurred. Based on the determination that the particular event has occurred, the program also sends a set of notifications to a set of subscribers.

In some embodiments, determining that the particular event has occurred may include determining that each previous sensor data in a set of previous sensor data sensed by a sensor in the set of sensors comprises a first defined value and, based on the set of sensor data, determining that at least one sensor in the set of sensors changed from sensing the first defined value to sensing a second defined value.

In some embodiments, the program may further, based on the determination that the particular event has occurred, determine a building at which the particular has occurred, determine that the set of subscribers is associated with the building, and generate the set of notifications. Each notification in the set of notifications may include a reference to a floor plan of the building that shows exits out of the building, locations of the set of sensors within the building, and statuses of the set of sensors. The program may further receive, via the reference, a request for the floor plan, and, in response to the request, provide the floor plan to a client device of a subscriber in the set of subscribers. The program may further provide real-time updates to the statuses of the set of sensors.

In some embodiments, sending the set of notifications to the set of subscribers may include sending a notification in the set of notifications to an application operating on a client device of a subscriber in the set of subscribers.

In some embodiments, a method receives a set of sensor data from a set of sensors. Each sensor in the set of sensors is configured to sense a physical quantity. Based on the set of sensor data, the method further determines that a particular event has occurred. Based on the determination that the particular event has occurred, the method also sends a set of notifications to a set of subscribers.

In some embodiments, determining that the particular event has occurred may include determining that each previous sensor data in a set of previous sensor data sensed by a sensor in the set of sensors comprises a first defined value and, based on the set of sensor data, determining that at least one sensor in the set of sensors changed from sensing the first defined value to sensing a second defined value.

In some embodiments, the method may further, based on the determination that the particular event has occurred, determine a building at which the particular has occurred, determine that the set of subscribers is associated with the building, and generate the set of notifications. Each notification in the set of notifications may include a reference to a floor plan of the building that shows exits out of the building, locations of the set of sensors within the building, and statuses of the set of sensors. The method may further receive, via the reference, a request for the floor plan and, in response to the request, provide the floor plan to a client device of a subscriber in the set of subscribers. The method may further provide real-time updates to the statuses of the set of sensors.

In some embodiments, sending the set of notifications to the set of subscribers may include sending a notification in the set of notifications to an application operating on a client device of a subscriber in the set of subscribers.

In some embodiments, a system includes a set of processing units and a non-transitory machine-readable medium that stores instructions. The instructions cause at least one processing unit to receive a set of sensor data from a set of sensors. Each sensor in the set of sensors is configured to sense a physical quantity. Based on the set of sensor data, the instructions further cause the at least one processing unit to determine that a particular event has occurred. Based on the determination that the particular event has occurred, the instructions also cause the at least one processing unit to send a set of notifications to a set of subscribers.

In some embodiments, determining that the particular event has occurred may include determining that each previous sensor data in a set of previous sensor data sensed by a sensor in the set of sensors comprises a first defined value and, based on the set of sensor data, determining that at least one sensor in the set of sensors changed from sensing the first defined value to sensing a second defined value.

In some embodiments, the instructions may further cause the at least one processing unit to, based on the determination that the particular event has occurred, determine a building at which the particular has occurred, determine that the set of subscribers is associated with the building, and generate the set of notifications. Each notification in the set of notifications may include a reference to a floor plan of the building that shows exits out of the building, locations of the set of sensors within the building, and statuses of the set of sensors. The instructions may further cause the at least one processing unit to receive, via the reference, a request for the floor plan and, in response to the request, provide the floor plan to a client device of a subscriber in the set of subscribers. The instructions may further cause the at least one processing unit to provide real-time updates to the statuses of the set of sensors.

The following detailed description and accompanying drawings provide a better understanding of the nature and advantages of various embodiments of the present disclosure.

BRIEF DESCRIPTION OF THE DRAWINGS

FIGS. 3A and 3B illustrate examples of a sensor table according to some embodiments.

FIG. 4 illustrates an example of a configuration lookup table according to some embodiments.

FIGS. 7A and 7B illustrate examples of a sensor table according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for providing a data processing system for smart devices. For example, the data processing system may receive sensor data from several sensors (e.g., fire sensors, smoke sensors, temperature sensors, etc.) installed in a building. Based on the sensor data, the data processing system determines configurations for several smart devices installed in and/or around the building. The smart devices can be configured to display different information (e.g., whether an exit is safe to use) based on different configurations. Finally, the data processing system sends the configurations to the smart devices so the smart devices and display the proper information. In this manner, evacuation paths can be automatically calculated end to end and prevent instances where people are directed to go into unsafe areas or dead ends.

In addition, described here are techniques for providing a data processing system that detects events and provides appropriate notifications. For instance, the data processing system can receive sensor data from several sensors installed in a building. Based on the sensor data, the data processing system detects whether there is a change in the sensor data sensed by the several sensors. Based on detected changes in the sensor data, the data processing system generates a particular notification and sends the notification to subscribers associated with the building.

Figure 1:
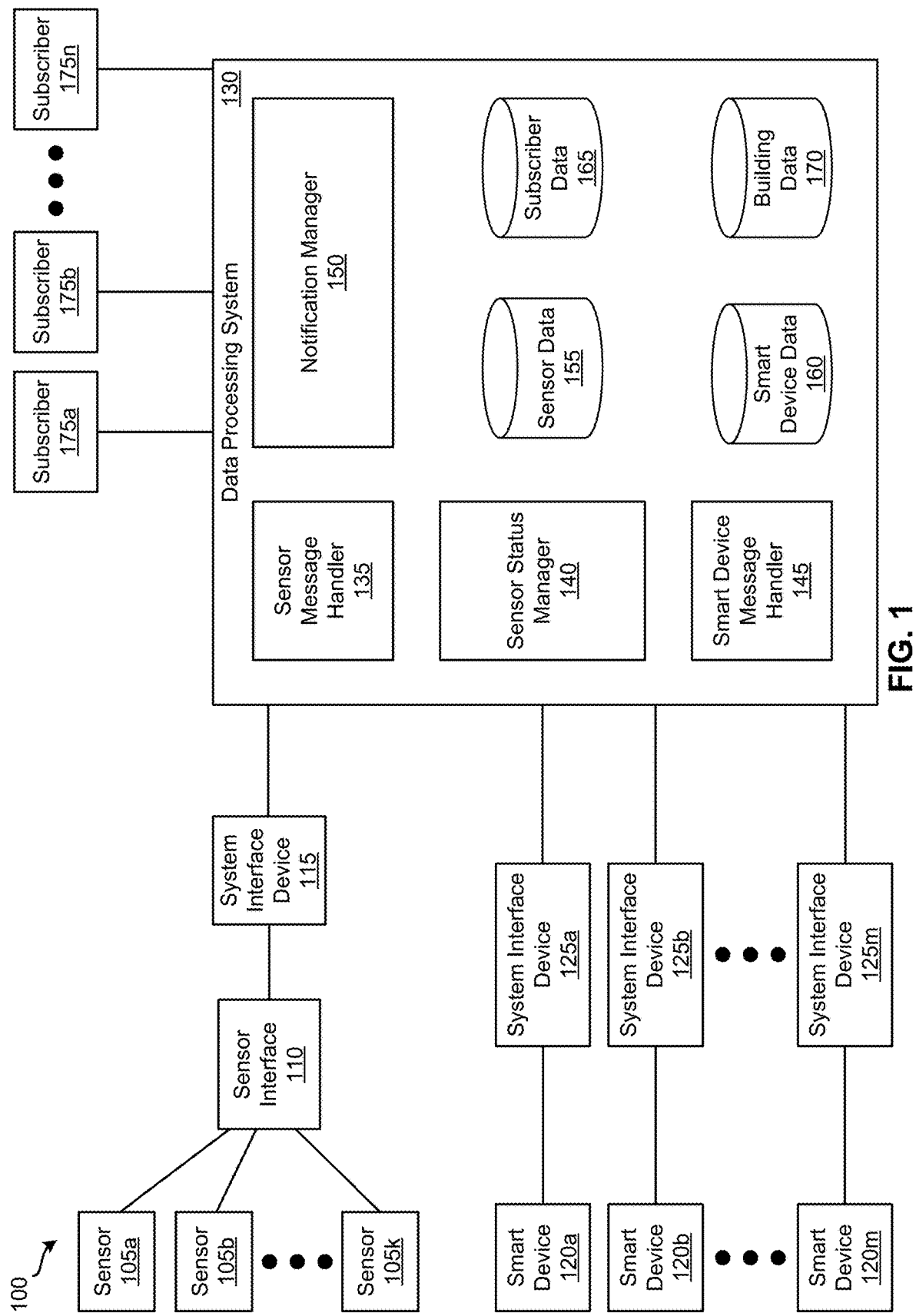
FIG. 1 illustrates a system according to some embodiments.

FIG. 1 illustrates a system 100 according to some embodiments. As shown, system 100 includes sensors 105a-k, sensor interface 110, system interface device 115, smart devices 120a-m, system interface devices 125a-m, data processing system 130, and subscribers 175a-n. Subscribers 175a-n may be users that receive notifications from data processing system 130. Each subscriber 175 can receive notifications in a number of different ways. For example, a subscriber 175 may receive notifications through email, text message, short message service (SMS) message, an application operating on a client device, etc.

Sensors 105a-k are each configured to sense a physical quantity in an environment. For example, a sensor 105 may be a fire sensor configured to sense the presence of fire, a smoke sensor configured to sense the presence of smoke, a temperature sensor configured to sense temperature, a gas sensor (e.g., a carbon monoxide sensor) configured to sense the presence of gas, a water sensor configured to sense the presence of water, etc. In some embodiments, sensors 105a-k are the same type of sensor. In other embodiments, sensors 105a-k may be different types of sensors. Still, in some embodiments, sensors 105a-k can be a combination of the same type of sensors and different types of sensors.

Sensors 105a-k may use different techniques to provide sensor data to sensor interface 110. For example, in some embodiments, each of the sensors 105a-k can send sensor interface 110 sensor data at defined intervals (e.g., once a second, once every thirty seconds, once a minute, etc.). In other embodiments, each sensor 105 may receive a request for sensor data from sensor interface 110. In response to the request, the sensor 105 sends sensor interface 110 the requested sensor data. Still, in some embodiments, sensors 105a-k can be configured to only send sensor data upon detection of a particular event (e.g., the presence of fire, smoke, gas, etc.). For this example, sensors 105a-k are installed in and/or around a building.

Sensor interface 110 is responsible for managing sensor data sensed by sensors 105a-k. For example, in some instances, sensor interface 110 may receive sensor data from sensors 105a-k. In other instances, sensor interface 110 sends sensors 105a-k requests for sensor data at defined intervals (e.g., once a second, once every thirty seconds, once a minute, etc.). When sensor interface 110 receives sensor data from a sensor 105, sensor interface 110 forwards the sensor data to system interface device 115. In some embodiments, the sensor data that sensor interface 110 sends system interface device 115 specifies, for each of the sensors 105a-k, a sensor identifier (ID) for uniquely identifying the sensor 105 and the sensor data sensed by the sensor 105. Sensor interface 110 can be implemented by a sensor panel (e.g., a fire sensor panel, a smoke sensor panel, etc.).

System interface device 115 serves as an interface between sensor interface 110 and data processing system 130. For instance, when system interface device 115 receives sensor data from sensor interface 110, system interface device 115 forwards the sensor data to data processing system 130. As mentioned above, the sensor data that system interface device 115 receives from sensor interface 110 specifies, for each of the sensors 105a-k, a sensor ID associated with the sensor 105 and the sensor data sensed by the sensor 105. In some of those cases, system interface device 115 sends data processing system 130 the sensor data by generating, for each of the sensors 105a-k, a message that includes a sensor ID associated with the sensor 105 and the sensor data sensed by the sensor 105 and sending the message to data processing system 130. System interface device 115 may be implemented as an Internet of Things (IoT) device. In some embodiments, an IoT device is a computing device that is configured to transmit data a network without human-to-human interaction or human-to-computer interaction.

Each of the smart devices 120a-m may be an electronic device configured to connect to other devices or networks through one or more communication protocols. In some embodiments, smart devices 120a-m can operate interactively and autonomously. In this example, smart devices 120a-m are installed in and/or around a building. As such, each of the smart devices 120a-m is also configured to provide (e.g., via a display screen and/or lights coupled to the smart device 120, a speaker coupled to the smart device 120, etc.) emergency exit information to guide exiting the building. The emergency exit information may indicate that an exit is safe to use; that the exit is unsafe to use; a direction towards a safe exit, that the smart device 120 is not functional and, thus, to ignore the smart device 120; etc.

Different visual and/or aural indicators may be used to indicate different emergency exit information. For instance, each of the smart devices 120a-m may display a green lit icon (e.g., a walk icon, an arrow icon, etc.) to indicate that an exit is safe to use or indicate a direction towards a safe exit, a red lit icon (e.g., a stop icon, an "X" icon) to indicate that the exit is unsafe to use, and a black lit icon (e.g., a not functioning icon) to indicate that the smart device 120 is not functional. As another example, each of the smart devices 120a-m may emit a first defined sound or voice message (e.g., "exit this way") to indicate that an exit is safe to use, a second defined sound or voice message (e.g., "do not use this exit") to indicate that the exit is unsafe to use, and a third defined sound or voice message (e.g., "ignore this exit") to indicate that the smart device 120 is not functional. One of ordinary skill in the art will appreciate that additional and/or different visual or aural indicators may be used in some embodiments. When a smart device 120 receives from a system interface device 125 instructions to provide certain emergency exit information, the smart device 120 provides the respective emergency exit information (e.g., by displaying the corresponding information and/or emitting the corresponding sound)s.

System interface devices 125a-m are each configured to manage a particular smart device 120. As shown in FIG. 1, system interface device 125a manages smart device 120a, system interface device 125b manages smart device 120b, system interface device 125c manages smart device 120c, and so on and so forth. Each system interface device 125 is configured to receive configurations from data processing system 130 and, based on the configuration, configure the smart device 120 that the system interface device 125 is managing. For example, a system interface device 125 can receive from data processing system 130 a configuration that includes instructions to configure a smart device 120 to provide specific emergency exit information. In response to receiving the configuration, the system interface device 125 configures the smart device to provide the specified emergency exit information.

As illustrated in FIG. 1, data processing system 130 includes sensor message handler 135, sensor status manager 140, smart device message handler 145, notification manager 150, and storages 155-170. Sensor data storage 155 stores sensor data sensed by sensors 105a-k (e.g., real-time sensor data, historical sensor data, etc.). Smart device data storage 160 is configured to store configurations for smart devices 120a-m. Subscriber data storage 165 stores a set of subscriber information associated with a building. Examples of subscriber information may include a name of a subscriber (e.g., a building facility manager, an owner of the building, an insurance company, a security company, a firefighter, etc.), contact information (e.g., a telephone number, an email address, a user identifier (ID) associated with a messaging application, etc.) associated with the subscriber, etc. Building data storage 170 is configured to store building information associated with a building. Examples of building information can include an address of a building, a contact associated with the building, contact information (e.g., a telephone number, an email address, etc.) associated with the contact, a floor plan of the building that includes locations of sensors and smart devices installed in and/or around the building, etc.

Sensor message handler 135 serves to handle messages received from system interface device 115. For example, sensor message handler 135 can receive from system interface device 115 a message specifying a sensor ID associated with a sensor 105 and sensor data sensed by the sensor 105. In response to receiving the message, sensor message handler 135 sends the sensor ID and the sensor data to sensor status manager 140 for processing.

Sensor status manager 140 is responsible for managing sensor data. For instance, when sensor status manager 140 receives from sensor message handler 135 a sensor ID associated with a sensor 105 and sensor data sensed by the sensor 105, sensor status manager 140 updates the sensor data stored in sensor data storage 155 with the received sensor data. Then, sensor status manager 140 uses data stored in sensor data storage 155 and smart device data storage 160 to determine configurations for smart devices 120a-m. In some embodiments, sensor status manager 140 also uses data stored in data from building data storage 170 (e.g., a floor plan) to determine configurations for smart devices 120a-m. Sensor status manager 140 sends the configurations to smart device message handler 145. In addition, sensor status manager 140 may check whether the sensor data of sensors 105a-k before the update all specify a first defined value (e.g., "no fire," "no smoke," "no gas," etc.). If so, sensor status manager 140 checks whether the update to the sensor data stored in sensor data storage 155 causes the sensor data associated with a sensor 105 to change from the first defined value to a second defined value (e.g., "fire present," "smoke present," "gas present," etc.). If sensor status manager 140 detects such a change, sensor status manager 140 sends notification manager 150 a notification indicating that an occurrence of an event is detected.

Sensor status manager 140 may also detect other events. In some embodiments where sensors 105a-k are configured to send sensor interface 110 sensor data at defined intervals, sensor status manager 140 may determine that a sensor(s) 105, sensor interface 110, and/or system interface device 115 has failed when sensor status manager 140 has not received sensor data from the sensor(s) 105 at the defined intervals. Upon making such a determination, sensor status manager 140 sends notification manager 150 a message indicating the sensor(s) 105, sensor interface 110, and/or system interface device 115 requires servicing. Sensor status manager 140 also sends smart device message handler 145 configurations for smart devices 120a-m to indicate that smart devices 120a-m are not functional. In some instances where smart device message handler 145 is unable to communicate with a system interface device(s) 125, sensor status manager 140 determines that the system interface device(s) 125 is not functional. In such instances, sensor status manager 140 sends notification manager 150 a message indicating the system interface devices(s) requires servicing.

Smart device message handler 145 handles messages for smart devices 120a-m. For example, smart device message handler 145 may receive from sensor status manager 140 configurations for smart devices 120a-m. In response, smart device message handler 145 generates a message for each smart device 120 that includes the respective configuration for the smart device 120 and sends the message to the system interface device 125 that is responsible for managing the smart device 120. In some embodiments smart device message handler 145 continues to send current configurations to system interface devices 125a-m at defined intervals (e.g., once every two seconds, once every fifteen seconds, once a minute, etc.). In other embodiments, smart device message handler 145 sends a system interface device(s) 125 configurations for a corresponding smart device(s) 120 when the state of the smart device(s) 120 changes from its current state.

Notification manager 150 is configured to manage notifications for subscribers 175a-n. For instance, upon receiving from sensor status manager 140 a notification indicating that an occurrence of an event is detected, notification manager 150 accesses building data storage 170 to retrieve building information associated with building in and/or around which sensors 105a-k and smart devices 120a-m are installed. Next, notification manager 150 accesses subscriber data storage 165 to retrieve the set of subscriber information associated with the building. Notification manager 150 then generates a notification that includes a reference to the building information (e.g., a unified resource locator (URL) to a webpage providing the building information) for each subscriber in the set of subscribers. Finally, notification manager 150 sends the notifications to the respective subscribers 175a-n. In some embodiments, notification manager 150 uses the subscriber information associated with each subscriber 175 to determine the manner in which to send the notification (e.g., email, text message, SMS message, an application operating on a client device, etc.). As another example, notification manager 150 can receive from sensor status manager 140 a message indicating 150 a message indicating a sensor(s) 105, sensor interface 110, system interface device 115 requires servicing, and/or a system interface device(s) 120 requires servicing. In response to such a message, notification manager 150 sends the notifications to the respective subscribers 175a-n.

FIG. 1 shows a particular configuration of system 100. One of ordinary skill in the art will realize that different configurations of system 100 are possible. For example, in some embodiments, system 100 does not include sensor interface 110. Instead, system interface 115 manages sensor data sensed by sensors 105a-k in the manner described above. In some such embodiments, system 100 can have multiple system interface devices similarly configured to system interface device 115 to manage the sensor data. In some of these embodiments, each system interface device is configured to manage sensor data for one or more sensors 105a-k. In some embodiments, system 100 can have multiple sensor interfaces similarly configured to sensor interface 110 to manage the sensor data sensed by sensors 105a-k. In some of these embodiments, each sensor interface is configured to manage sensor data for one or more sensors 105a-k. As another example, system 100 may have fewer system interface devices 125 where at least one system interface device 125 is responsible for configuring more than one smart devices 120a-m. In some instances, a single system interface device 125 may be used to configure smart devices 120a-m. In some embodiments, each system interface device 125 can be embedded in the corresponding smart device 120. In some cases, one or more smart devices 120a-m may include one or more sensors 105a-k. While FIG. 1 shows notification manager 150, subscriber data storage 165, and building data storage 170 as being part of data processing system 130, these components may be implemented by a separate computing system in some embodiments.

Figure 2:
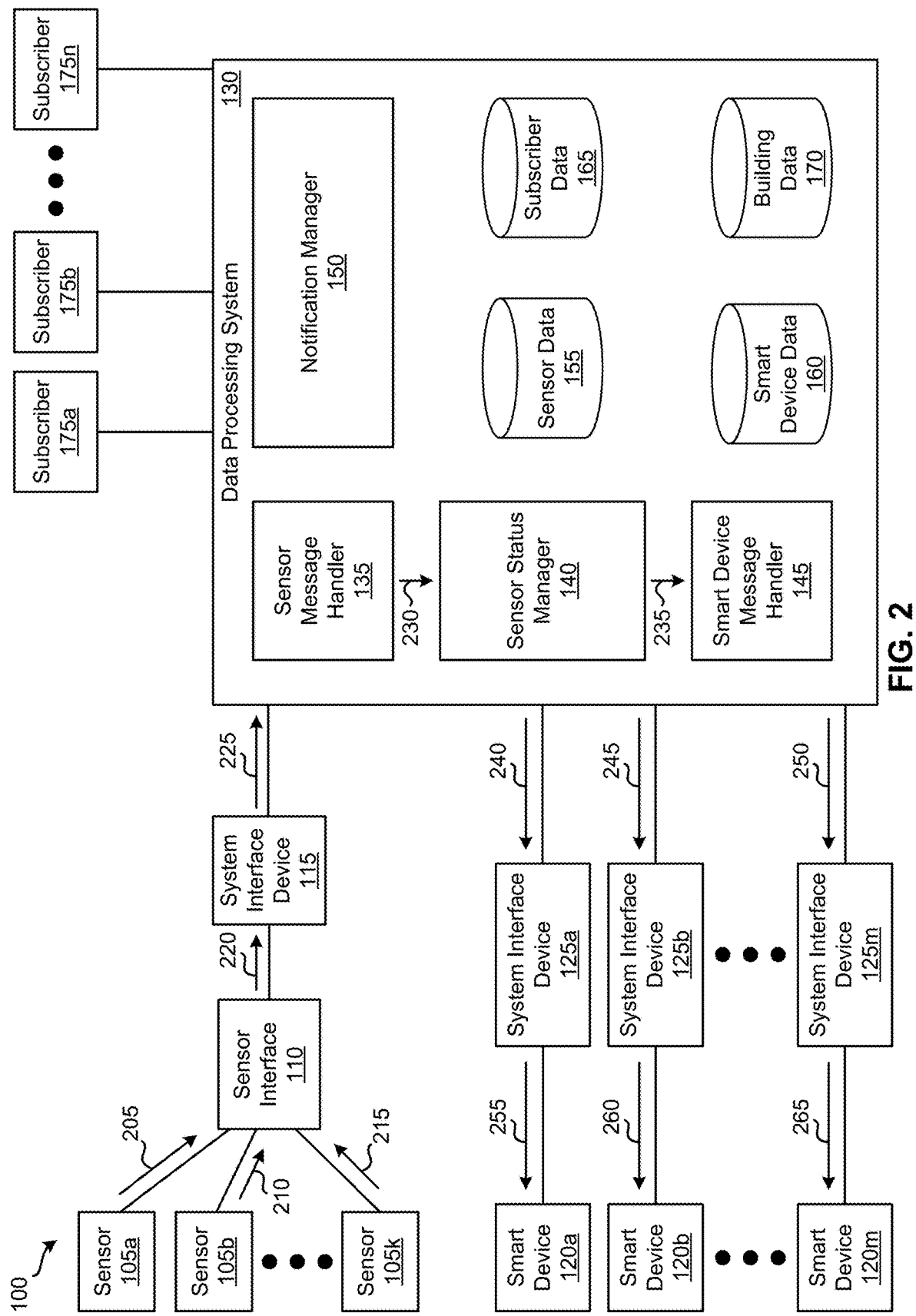
FIG. 2 illustrates an example dataflow through the system illustrated in FIG. 1 according to some embodiments.

FIG. 2 illustrates an example dataflow through system 100 according to some embodiments. Specifically, the dataflow shows how smart devices 120a-m are configured based on sensor data sensed by sensors 105a-k. For this example, sensors 105a-k are fire sensors. The dataflow starts by sensors 105a-k sending, at 205-215, sensor data (e.g., no fire is sensed or fire is sensed) to sensor interface 110. Upon receiving the sensor data from sensors 105a-k, sensor interface 110, sends, at 220, the sensor data to system interface device 115. The sensor data that sensor interface 110 sends system interface device 115 specifies, for each of the sensors 105a-k, a sensor ID associated with the sensor 105 and the sensor data sensed by the sensor 105. Once system interface device 115 receives the sensor data from sensor interface 110, system interface device 115 generates, for each of the sensors 105a-k, a message that includes the sensor ID associated with the sensor 105 and the sensor data sensed by the sensor 105 and sending, at 225, the message to data processing system 130.

When sensor message handler 135 receives from system interface device 115 a message specifying a sensor ID associated with a sensor 105 and sensor data sensed by the sensor 105, sensor message handler 135 sends, at 230, the sensor ID and the sensor data to sensor status manager 140. Upon receiving the data, sensor status manager 140 updates the sensor data stored in sensor data storage 155 with the received sensor data.

FIGS. 3A and 3B illustrate examples of a sensor table 300 according to some embodiments. In particular, FIG. 3A illustrates sensor table 300 before sensor status manager 140 updates the sensor data stored in sensor data storage 155. Sensor table 300 is stored in sensor data storage 155. For this example, system 100 has three sensors with a first sensor with a sensor ID of "Sensor 1," a second sensor with a sensor ID of "Sensor 2," and a third sensor with a sensor ID of "Sensor 3." Thus, sensor table includes three columns. As shown, the first column is configured to store sensor data for the first sensor, the second column is configured to store sensor data for the second sensor, and the third column is configured to store sensor data for the third sensor. So before sensor status manager 140 updates the sensor data, the first sensor previously sensed fire, the second sensor previously did not sense fire, and the third sensor previously did not sense fire.

In this example dataflow, the data that sensor message handler 135 sends to sensor status manager 140 specifies a sensor ID of "Sensor 3" and sensor data specifying "Fire" indicating that fire was sensed by the third sensor. FIG. 3B illustrates sensor table 300 after sensor status manager 140 updates the sensor data stored in sensor data storage 155 with the received sensor data. As shown, sensor table 300 in FIG. 3B shows the third column for storing sensor data for the third sensor updated with the sensor data received from sensor message handler 135.

Returning to FIG. 2, after sensor status manager 140 updates the sensor data stored in sensor data storage 155 with the received sensor data, sensor status manager 140 uses data stored in sensor data storage 155 and smart device data storage 160 to determine configurations for smart devices 120a-m. In some embodiments, a configuration lookup table is used to determine configurations for smart devices 120a-m.

FIG. 4 illustrates an example of a configuration lookup table 400 according to some embodiments. Configuration lookup table 400 is stored in smart device data storage 160. As shown, configuration lookup table 400 includes six columns. The left three columns are configured to store different permutations of sensor data sensed by the three sensors for this example. Three smart devices are used in this example. As shown, the right three columns are configured to store configurations for the three smart devices (i.e., smart device 1 (SD1), smart device 2 (SD2), and smart device 3 (SD 3)). Each row in configuration lookup table 400 specifies a set of sensor values for the three sensors and a corresponding configuration for each of the three smart devices. That is, each row provides a mapping between a set of sensor values for the three sensors and configurations for the three smart devices. In this example, sensor status manager 140 determine configurations for smart devices 1-3 by accessing sensor table 300 stored in sensor data storage 155 to retrieve the current sensor values sensed by the three sensors and then performing a lookup on configuration lookup table 400 to identify a row that has sensor values that match the sensor values retrieved from sensor table 300. As shown in FIG. 3B, the sensor values for three sensors is "Fire" for Sensor 1, "No fire" for Sensor 2, and "Fire" for Sensor 3. The row in configuration lookup table 400 that matches these sensor values is row 405. As such, row 405 specifies the configuration for smart device 1 as "Red," the configuration for smart device 2 as "Green," and the configuration for smart device 3 as "Red." The same configuration for smart devices 1-3 can be used for different combinations of sensor values for sensors 1-3. For example, the same configuration for smart devices 1-3 is used in this example for when sensors 1-3 have the sensor values "Fire," "Fire," and "No fire," as shown in the fifth row of table 400, and when sensors 1-3 have the sensor values "Fire," "Fire," and "Fire," as shown in the last row of table 400.

Returning to FIG. 2, sensor status manager 140 sends, at 235, the configurations to smart device message handler 145. Once smart device message handler 145 receives configurations for smart devices 120a-m from sensor status manager 140, smart device message handler 145 generates a message for each smart device 120 that includes the respective configuration for the smart device 120 and sends the message to the system interface device 125 that is responsible for managing the smart device 120. In this example, smart device 120a is smart device 1, smart device 120b is smart device 2, and smart device 120m is smart device 3. Hence, smart device message handler 145 generate a message for smart device 120a that includes a "Red" configuration and sends, at 240, the message to system interface device 125a. Smart device message handler 145 also generates a message for smart device 120b that includes a "Green" configuration and sends the message to system interface device 125b. Lastly, smart device message handler 145 generates a message for smart device 120m that includes a "Red" configuration and sends the message to system interface device 125m.

For this example, a "Red" configuration includes instructions for configuring a smart device to provide a red lit icon to indicate that an exit is unsafe to use and a "Green" configuration includes instructions for configuring a smart device to provide green lit icon to indicate that an exit is safe to use or indicate a direction towards a safe exit. Therefore, when system interface device 125a receives the message from smart device message handler 145, system interface device 125a configures smart device 120a to provide a red lit icon to indicate that an exit is unsafe to use. Similarly, when system interface device 125m receives the message from smart device message handler 145, system interface device 125m configures smart device 120m to provide a red lit icon to indicate that an exit is unsafe to use. Finally, when system interface device 125b receives the message from smart device message handler 145, system interface device 125b configures smart device 120b to provide a green lit icon to indicate that an exit is safe to use.

Figure 5:
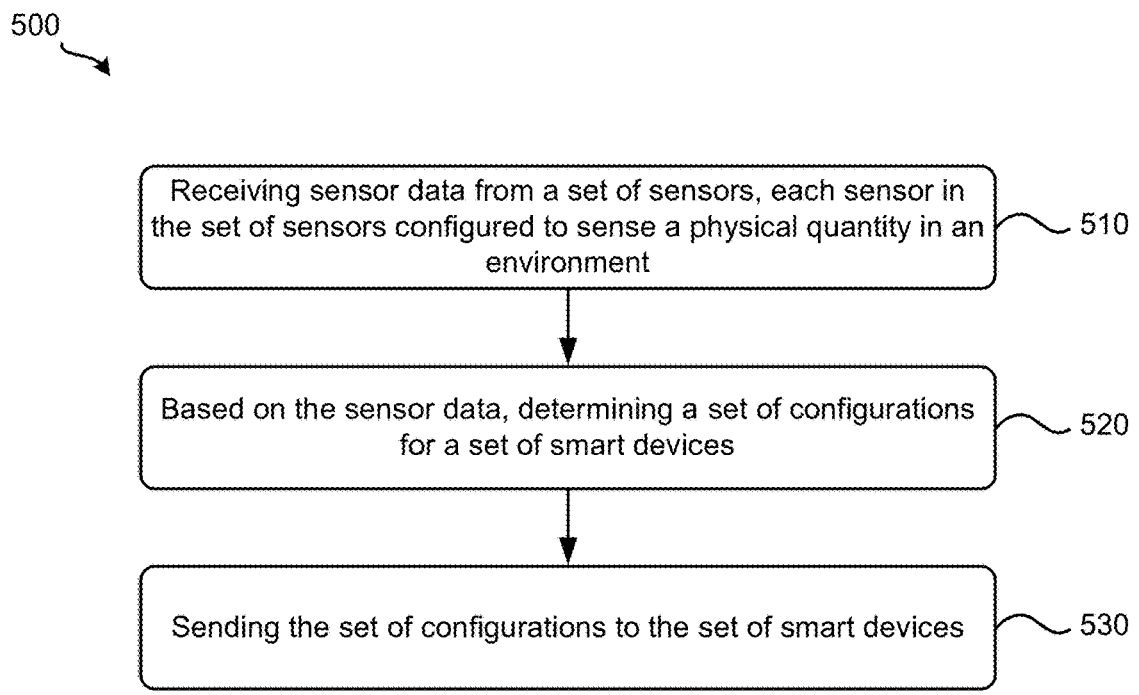
FIG. 5 illustrates a process for configuring smart devices according to some embodiments.

FIG. 5 illustrates a process 500 for configuring smart devices according to some embodiments. In some embodiments, data processing system 130 performs process 500. Process 500 begins by receiving, at 510, sensor data from a set of sensors. Each sensor in the set of sensors is configured to sense a physical quantity in an environment. Referring to FIG. 2 as an example, sensor message handler 135 may receive the sensor data from sensors 105a-k via sensor interface 110 and system interface device 115.

Next, based on the sensor data, process 500 determines, at 520, a set of configurations for a set of smart devices. Referring to FIG. 2 as an example, sensor status manager 140 can access sensor data stored in sensor data storage 155 (e.g. sensor table 200 shown in FIG. 3B) and configuration data stored in smart device data storage 160 (e.g., configuration lookup table 400) to determine configurations for smart devices 120a-m.

Finally, process 500 sends, at 530, the set of configurations to the set of smart devices. Referring to FIG. 2 as an example, smart device message handler 145 may receive configurations for smart devices 120a-m from sensor status manager 140. In response, smart device message handler 145 generates a message for each smart device 120 that includes the respective configuration for the smart device 120 and sends the message to the system interface device 125 that is responsible for managing the smart device 120.

Figure 6:
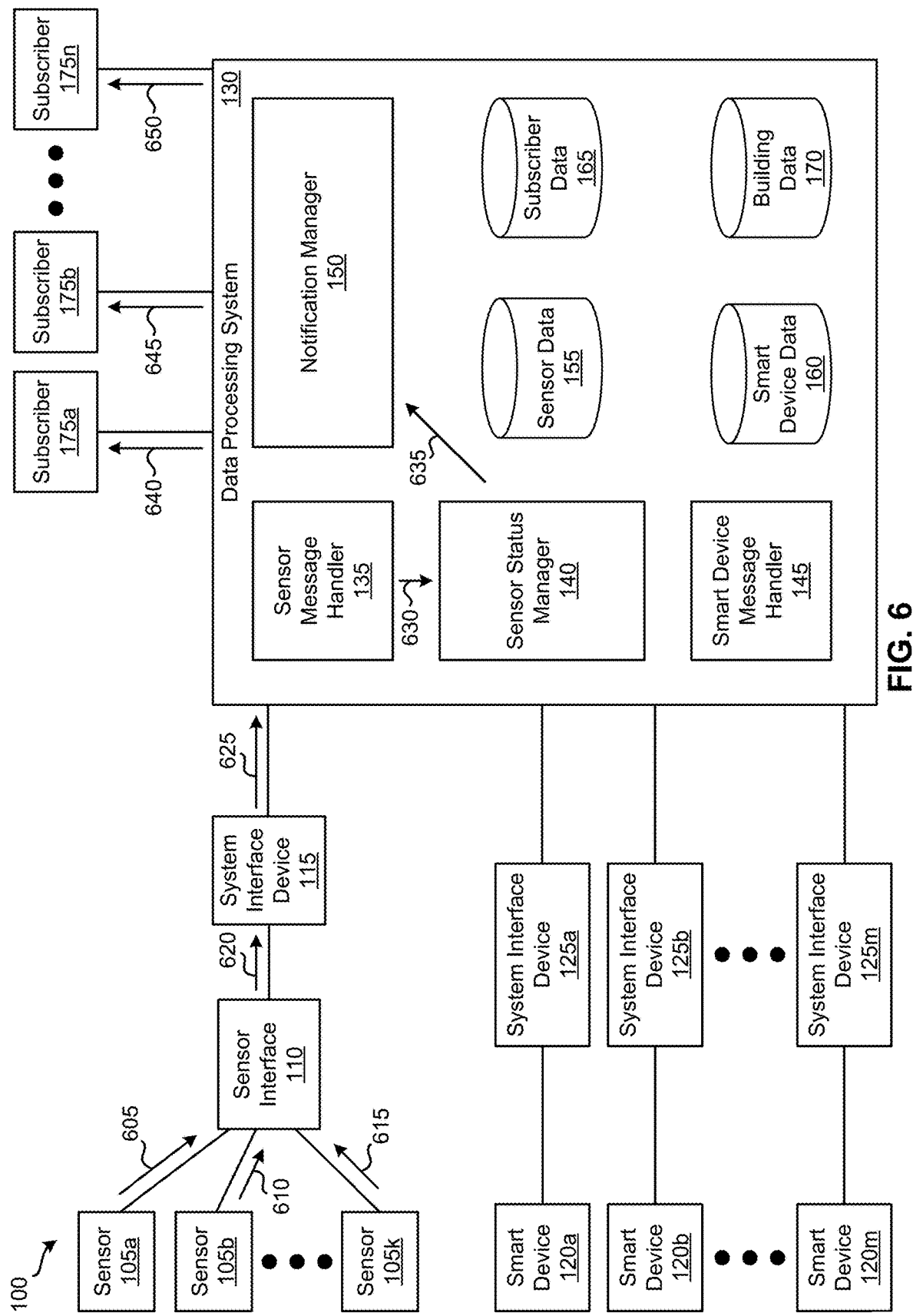
FIG. 6 illustrates another example dataflow through the system illustrated in FIG. 1 according to some embodiments.

FIG. 6 illustrates another example dataflow through the system illustrated in FIG. 1 according to some embodiments. In particular, this example dataflow shows how notification are generated for subscribers 175a-n. In this example, sensors 105a-k are fire sensors. The three sensors and smart devices used in the dataflow shown in FIG. 2 are also used for this example. The dataflow starts by sensors 105a-k sending, at 605-615, sensor data (e.g., no fire is sensed or fire is sensed) to sensor interface 110. In response to receiving the sensor data, sensor interface 110, sends, at 620, the sensor data to system interface device 115. The sensor data that sensor interface 110 sends system interface device 115 specifies, for each of the sensors 105a-k, a sensor ID associated with the sensor 105 and the sensor data sensed by the sensor 105. After receiving the sensor data from sensor interface 110, system interface device 115 generates, for each of the sensors 105a-k, a message that includes the sensor ID associated with the sensor 105 and the sensor data sensed by the sensor 105 and sending, at 625, the message to data processing system 130.

Upon receiving a message specifying a sensor ID associated with a sensor 105 and sensor data sensed by the sensor 105, sensor message handler 135 sends, at 630, the sensor ID and the sensor data to sensor status manager 140. In response to receiving the data, sensor status manager 140 checks whether the sensor data of sensors 105a-k before the update all specify a first defined value. If so, sensor status manager 140 checks whether the update to the sensor data stored in sensor data storage 155 causes the sensor data associated with a sensor 105 to change from the first defined value to a second defined value. For this example, the first defined value is "No fire" and the second defined value is "Fire."

FIGS. 7A and 7B illustrate examples of a sensor table 700 according to some embodiments. Specifically. FIG. 7A illustrates sensor table 700 before sensor status manager 140 updates the sensor data stored in sensor data storage 155. Sensor table 700 is stored in sensor data storage 155. As shown, sensor table 700 is similar to sensor tale 300 except the sensor values for the three sensor is "No fire," the first defined value.

In this example dataflow, the data that sensor message handler 135 sends to sensor status manager 140 specifies a sensor ID of "Sensor 2" and sensor data specifying "Fire" indicating that fire was sensed by the second sensor. FIG. 7B illustrates sensor table 700 after sensor status manager 140 updates the sensor data stored in sensor data storage 155 with the received sensor data. As shown, sensor table 700 in FIG. 7B shows the second column for storing sensor data for the second sensor updated with the sensor data received from sensor message handler 135.

For this example, when sensor status manager 140 detects the sensor value for a sensor 105 change from the first defined value to the second defined value based on the update, sensor status manager 140 sends, at 635, notification manager 150 a notification indicating that an occurrence of a fire event is detected. Upon receiving the notification from sensor status manager 140, notification manager 150 accesses building data storage 170 to retrieve building information associated with building in and/or around which the three sensors and the three smart devices are installed. Notification manager 150 then accesses subscriber data storage 165 to retrieve the set of subscriber information associated with the building. Next, notification manager 150 generates a notification that includes a reference to the building information (e.g., a URL to a webpage providing the building information) for each subscriber in the set of subscribers.

Figure 8:
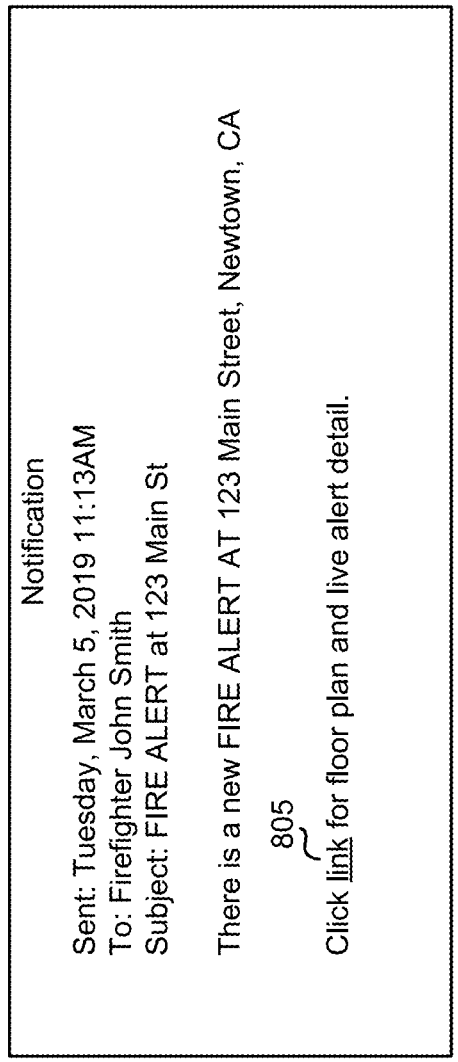
FIG. 8 illustrates an example notification according to some embodiments.

FIG. 8 illustrates an example notification 800 according to some embodiments. In particular, notification manager 150 generates notification 800 for this example. As shown, notification 800 is an email destined for a subscriber named John Smith. Notification 800 that includes an address of the building where occurrence of the fire event was detected. Also, notification 800 includes a reference 805 to a floor plan of the building (e.g., a URL to a webpage providing the floor plan of the building).

Figure 9:
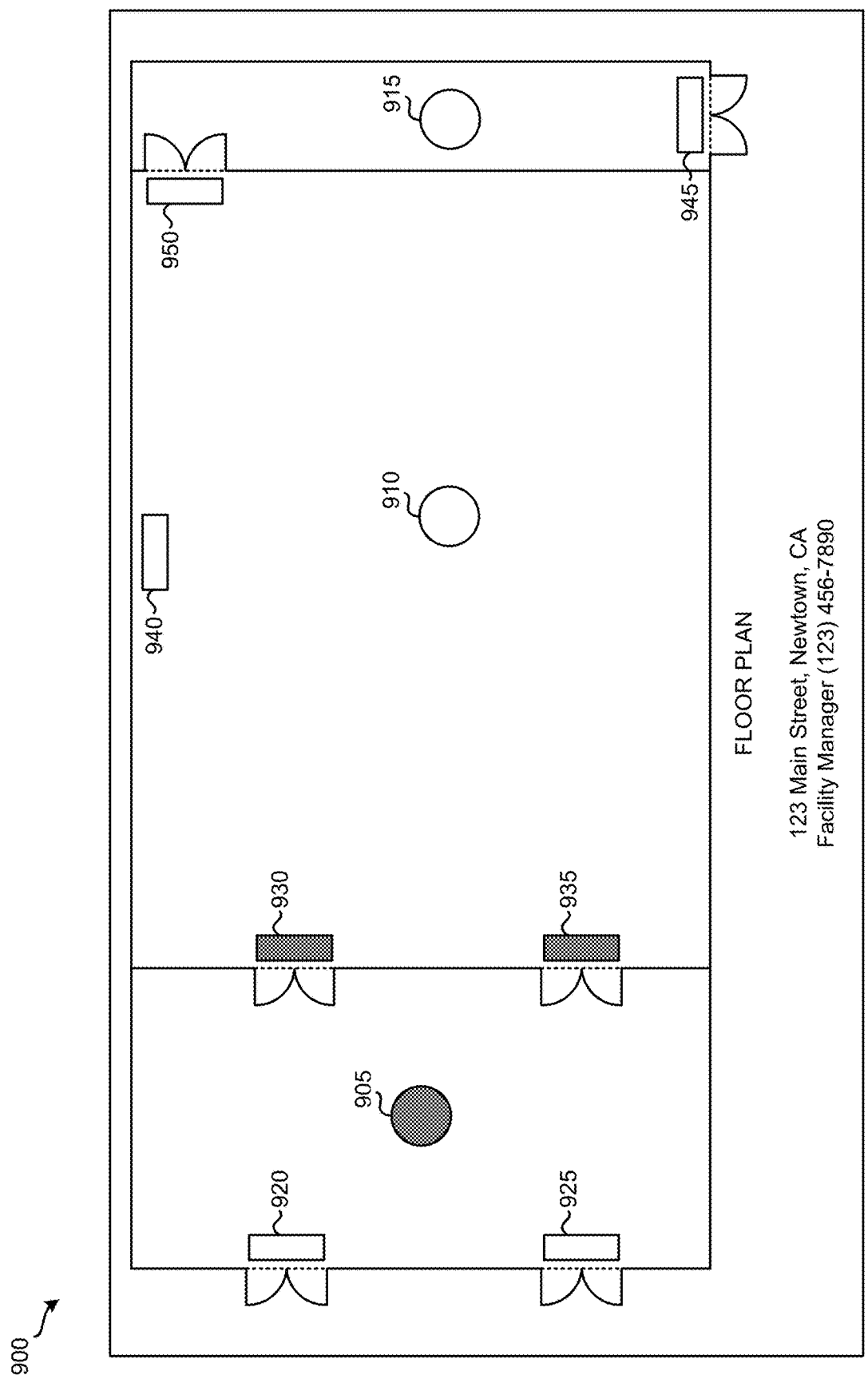
FIG. 9 illustrates an example floor plan according to some embodiments.

FIG. 9 illustrates an example floor plan 900 according to some embodiments. Specifically, floor plan 900 is the floor plan to which reference 805 points in this example. In some embodiments, data processing system 130 provides floor plan 900 to an application operating on a client device of the subscriber "John Smith". In other embodiments, data processing system 130 provides floor plan 900 to a web browser operating on the client device of the subscriber "John Smith". In some instances, the subscriber is authenticated to ensure that the subscriber has rights to access data associated with floor plan 900. As shown, floor plan 900 includes the address of the building as well as contact information for a contact associated with the building. Additionally, floor plan 900 shows the locations of three fire sensors 905-915 and seven smart devices 920-950. Floor plan also provides real-time statuses of the sensors 905-915 and smart devices 920-950. In this example, a gray fire sensor indicates that the fire sensor is sensing the presence of fire and a white fire sensor indicates that the fire sensor is not sensing the presence of fire. Here, sensor 905 is sensing the presence of fire while sensors 910 and 915 are not sensing the presence of fire. For this example, a gray smart device indicates that the smart device is providing emergency exit information indicating that an exit is unsafe to use while a white smart device indicates that the smart device is providing emergency exit information indicating that an exit is safe to use or indicating a direction towards a safe exit. Here, smart devices 930 and 935 are providing emergency exit information indicating that the respective exits are unsafe. Smart devices 920, 925, 945 and 950 are providing emergency exit information indicating that the respective exits are safe to use and smart device 940 is providing emergency exit information indicating the direction towards the top right exit is safe. When data processing system 130 receives sensor values for sensors 905-915 and/or smart devices 920-950, data processing system 130 updates floor plan 900 with the updated sensor values for sensors 905-915 and smart devices 920-950. The client device of each subscriber 175 that is providing floor plan 900 may, at define intervals (e.g., once every three seconds, once every ten seconds, once a minute, etc.), query data processing system 130 for status updates for sensors 905-915 and smart devices 920-950. Once the client device receives status updates, the client device updates the corresponding sensors 905-915 and smart devices 920-950 in floor plan 900.

Figure 10:
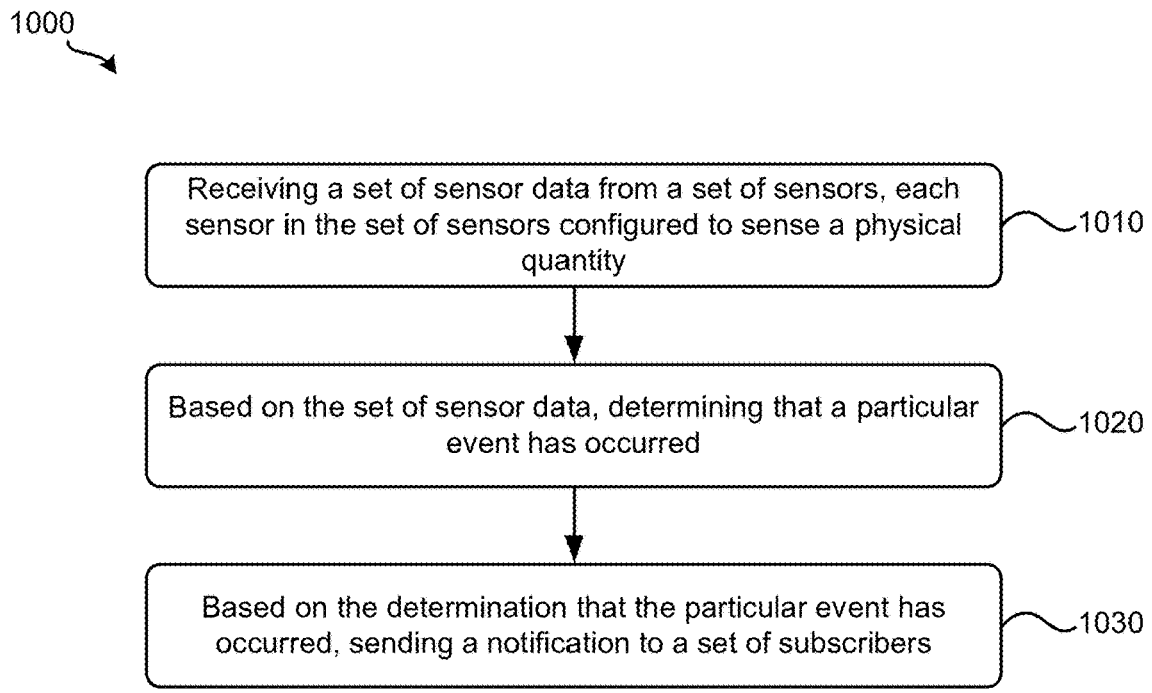
FIG. 10 illustrates a process for providing notifications of event occurrences according to some embodiments.

FIG. 10 illustrates a process 1000 for providing notifications of event occurrences according to some embodiments. In some embodiments, data processing system 130 performs process 1000. Process 1000 begins by receiving, at 1010, a set of sensor data from a set of sensors. Each sensor in the set of sensors is configured to sense a physical quantity. Referring to FIG. 6 as an example, sensor message handler 135 may receive the sensor data from sensors 105*a-k* via sensor interface 110 and system interface device 115.

Next, based on the set of sensor data, process 1000 determines, at 1020, that a particular event has occurred. Referring to FIG. 6 as an example, sensor status manager 140 checks whether the previous sensor data of sensors 105*a-k* before update the sensor data all specify a first defined value. If so, sensor status manager 140 checks whether the update to the sensor data stored in sensor data storage 155 causes the sensor data associated with a sensor 105 to change from the first defined value to a second defined value. When sensor status manager 140 detects the sensor value for a sensor 105 change from the first defined value to the second defined value based on the update, sensor status manager 140 sends, at 635, notification manager 150 a notification indicating that an occurrence of an event is detected.

Finally, based on the determination that the particular event has occurred, process 1000 sends, at 1030, a set of notifications to a set of subscribers. Referring to FIG. 6 as an example, notification manager 150 accesses building data storage 170 to retrieve building information associated with building in and/or around which the three sensors and the three smart devices are installed. Next, notification manager 150 accesses subscriber data storage 165 to retrieve the set of subscriber information associated with the building. Then, notification manager 150 generates a notification that includes a reference to the building information (e.g., a URL to a webpage providing the building information) for each subscriber in the set of subscribers.

FIGS. 1-10 describes examples and embodiments of a data processing system that handles sensors and smart devices installed for one building. One of ordinary skill in the art will understand that the data processing system may support sensors and smart devices installed for several buildings using the same and/or similar techniques described herein. Furthermore, in some embodiments, data processing system 130 may be implemented as a cloud computing system. In other embodiments, data processing system 130 can be implemented as a local, on-premise system. Still, in some embodiments, multiple of the same or different data processing systems (e.g., data processing system 130) may be deployed. For example, a first data processing system implemented as a cloud computing system may be deployed as a primary system and a second data processing system implemented as a local, on-premise data processing system may be deployed as a backup system. As another example, multiple data processing systems may be deployed as a distributed data processing system.

Figure 11:
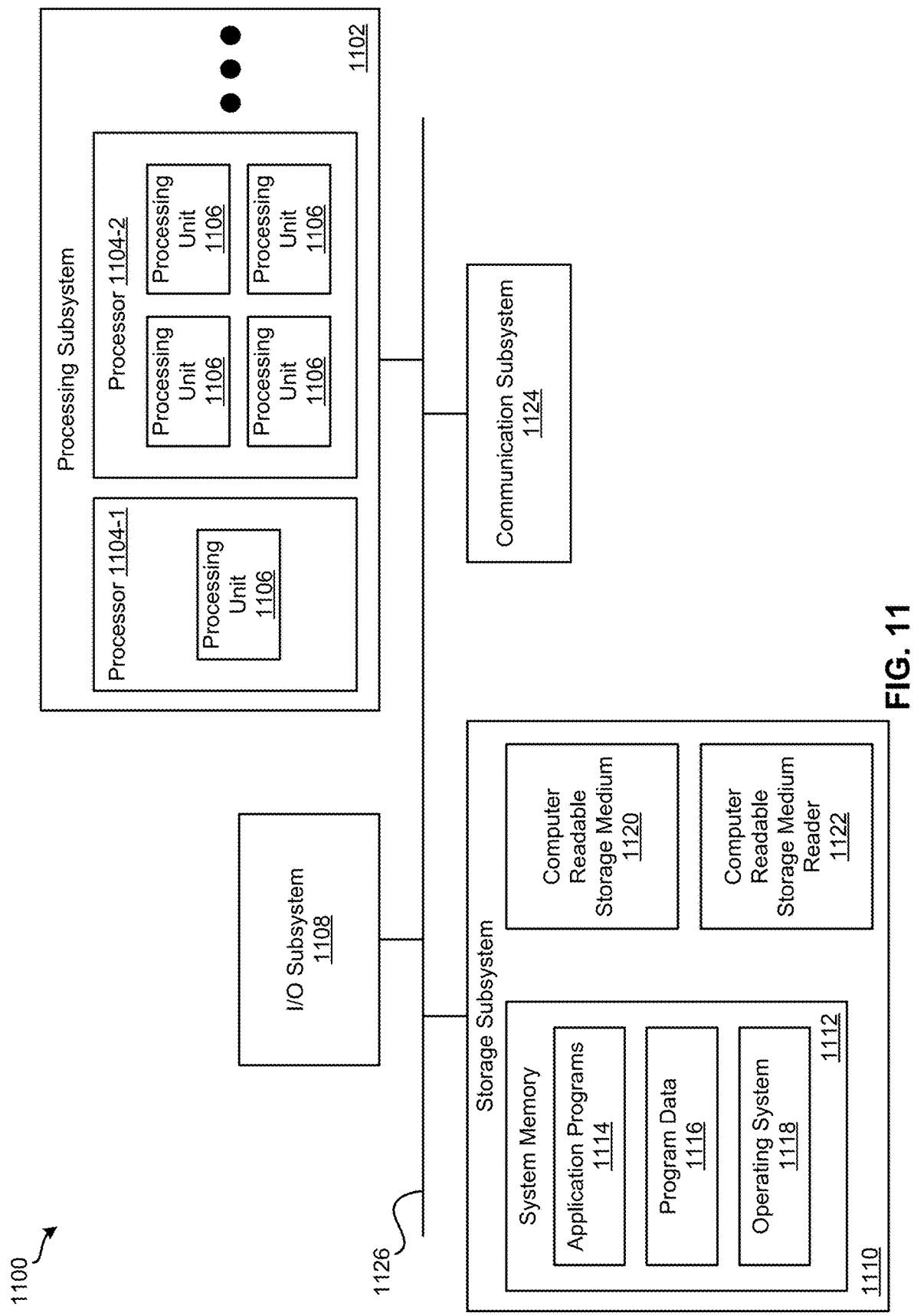
FIG. 11 illustrates an exemplary computer system, in which various embodiments may be implemented.

FIG. 11 illustrates an exemplary computer system 1100 for implementing various embodiments described above. For example, computer system 1100 may be used to implement data processing system 130. Computer system 1100 may be a desktop computer, a laptop, a server computer, or any other type of computer system or combination thereof. Some or all elements of sensor message handler 135, sensor status manager 140, smart device message handler 145, notification manager 150, or combinations thereof can be included or implemented in computer system 1100. In addition, computer system 1100 can implement many of the operations, methods, and/or processes described above (e.g., process 500 and process 1000). As shown in FIG. 11, computer system 1100 includes processing subsystem 1102, which communicates, via bus subsystem 1126, with input/output (I/O) subsystem 1108, storage subsystem 1110 and communication subsystem 1124.

Bus subsystem 1126 is configured to facilitate communication among the various components and subsystems of computer system 1100. While bus subsystem 1126 is illustrated in FIG. 11 as a single bus, one of ordinary skill in the art will understand that bus subsystem 1126 may be implemented as multiple buses. Bus subsystem 1126 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1102, which can be implemented as one or more integrated circuits (e.g., a conventional microprocessor or microcontroller), controls the operation of computer system 1100. Processing subsystem 1102 may include one or more processors 1104. Each processor 1104 may include one processing unit 1106 (e.g., a single core processor such as processor 1104-1) or several processing units 1106 (e.g., a multicore processor such as processor 1104-2). In some embodiments, processors 1104 of processing subsystem 1102 may be implemented as independent processors while, in other embodiments, processors 1104 of processing subsystem 1102 may be implemented as multiple processors integrate into a single chip or multiple chips. Still, in some embodiments, processors 1104 of processing subsystem 1102 may be implemented as a combination of independent processors and multiple processors integrated into a single chip or multiple chips.

In some embodiments, processing subsystem 1102 can execute a variety of programs or processes in response to program code and can maintain multiple concurrently executing programs or processes. At any given time, some or all of the program code to be executed can reside in processing subsystem 1102 and/or in storage subsystem 1110. Through suitable programming, processing subsystem 1102 can provide various functionalities, such as the functionalities described above by reference to process 500, process 1000, etc.

I/O subsystem 1108 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1100 to a user or another device (e.g., a printer).

As illustrated in FIG. 11, storage subsystem 1110 includes system memory 1112, computer-readable storage medium 1120, and computer-readable storage medium reader 1122. System memory 1112 may be configured to store software in the form of program instructions that are loadable and executable by processing subsystem 1102 as well as data generated during the execution of program instructions. In some embodiments, system memory 1112 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1112 may include different types of memory, such as static random access memory (SRAM) and/or dynamic random access memory (DRAM). System memory 1112 may include a basic input/output system (BIOS), in some embodiments, that is configured to store basic routines to facilitate transferring information between elements within computer system 1100 (e.g., during start-up). Such a BIOS may be stored in ROM (e.g., a ROM chip), flash memory, or any other type of memory that may be configured to store the BIOS.

As shown in FIG. 11, system memory 1112 includes application programs 1114, program data 1116, and operating system (OS) 1118. OS 1118 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1120 may be anontransitory computer-readable medium configured to store software (e.g., programs, code modules, data constructs, instructions, etc.). Many of the components (e.g., sensor message handler 135, sensor status manager 140, smart device message handler 145, and notification manager 150) and/or processes (e.g., process 500 and process 1000) described above may be implemented as software that when executed by a processor or processing unit (e.g., a processor or processing unit of processing subsystem 1102) performs the operations of such components and/or processes. Storage subsystem 1110 may also store data used for, or generated during, the execution of the software.

Storage subsystem 1110 may also include computer-readable storage medium reader 1122 that is configured to communicate with computer-readable storage medium 1120. Together and, optionally, in combination with system memory 1112, computer-readable storage medium 1120 may comprehensively represent remote, local, fixed, and/or removable storage devices plus storage media for temporarily and/or more permanently containing, storing, transmitting, and retrieving computer-readable information.

Computer-readable storage medium 1120 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1124 serves as an interface for receiving data from, and transmitting data to, other devices, computer systems, and networks. For example, communication subsystem 1124 may allow computer system 1100 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1124 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1124 may provide components configured for wired communication (e.g., Ethernet) in addition to or instead of components configured for wireless communication.

One of ordinary skill in the art will realize that the architecture shown in FIG. 11 is only an example architecture of computer system 1100, and that computer system 1100 may have additional or fewer components than shown, or a different configuration of components. The various components shown in FIG. 11 may be implemented in hardware, software, firmware or any combination thereof, including one or more signal processing and/or application specific integrated circuits.

Figure 12:
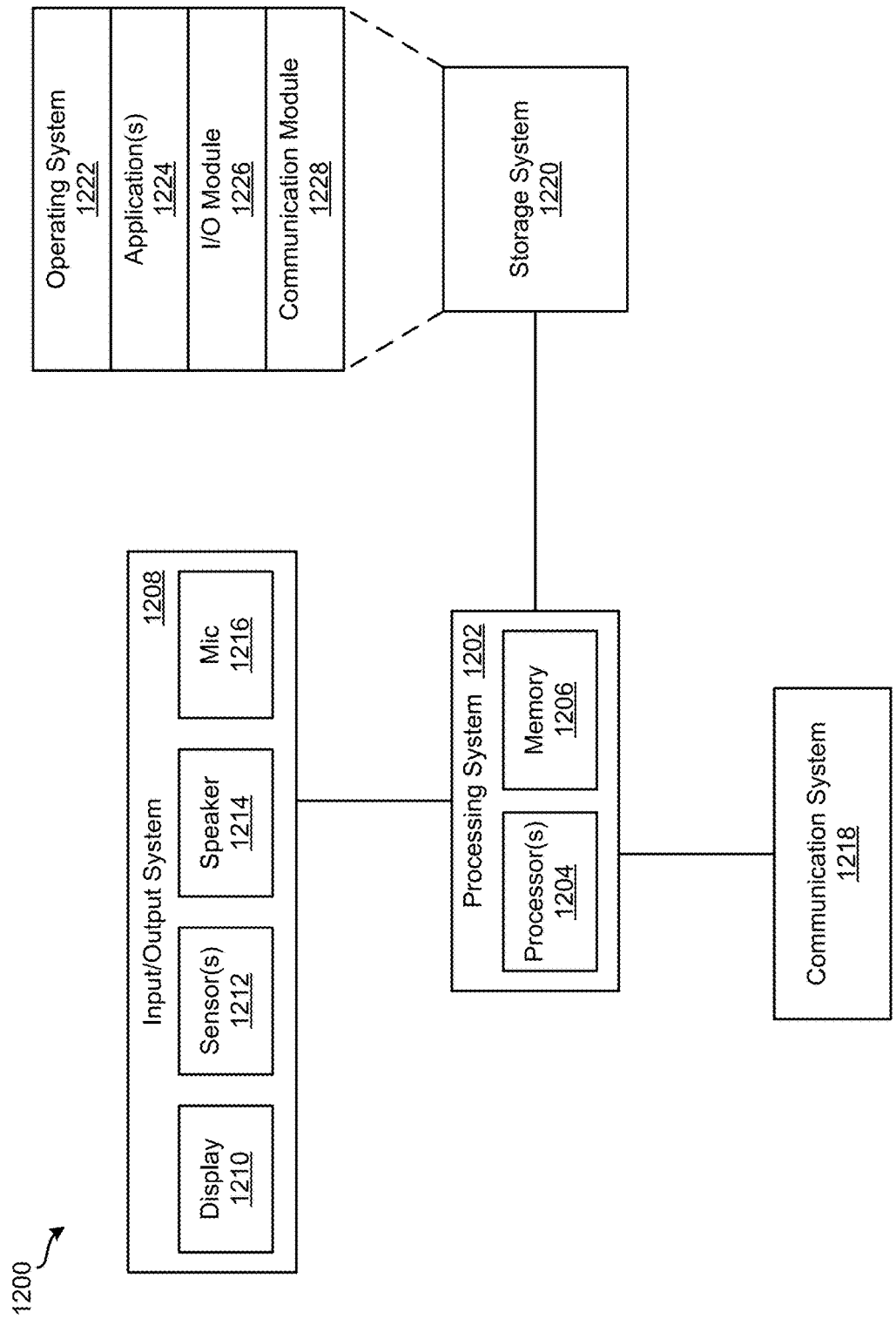
FIG. 12 illustrates an exemplary computing device, in which various embodiments may be implemented.

FIG. 12 illustrates an exemplary computing device 1200 for implementing various embodiments described above. For example, computing device 1200 may be used to implement system interface device 115, smart devices 120*a-m*, and system interface devices 125*a-m*. Computing device 1200 may be a cellphone, a smartphone, a wearable device, an activity tracker or manager, a tablet, a personal digital assistant (PDA), a media player, or any other type of mobile computing device or combination thereof. As shown in FIG. 12, computing device 1200 includes processing system 1202, input/output (I/O) system 1208, communication system 1218, and storage system 1220. These components may be coupled by one or more communication buses or signal lines.

Processing system 1202, which can be implemented as one or more integrated circuits (e.g., a conventional microprocessor or microcontroller), controls the operation of computing device 1200. As shown, processing system 1202 includes one or more processors 1204 and memory 1206. Processors 1204 are configured to run or execute various software and/or sets of instructions stored in memory 1206 to perform various functions for computing device 1200 and to process data.

Each processor of processors 1204 may include one processing unit (e.g., a single core processor) or several processing units (e.g., a multicore processor). In some embodiments, processors 1204 of processing system 1202 may be implemented as independent processors while, in other embodiments, processors 1204 of processing system 1202 may be implemented as multiple processors integrate into a single chip. Still, in some embodiments, processors 1204 of processing system 1202 may be implemented as a combination of independent processors and multiple processors integrated into a single chip.

Memory 1206 may be configured to receive and store software (e.g., operating system 1222, applications 1224, I/O module 1226, communication module 1228, etc. from storage system 1220) in the form of program instructions that are loadable and executable by processors 1204 as well as data generated during the execution of program instructions. In some embodiments, memory 1206 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1208 is responsible for receiving input through various components and providing output through various components. As shown for this example, I/O system 1208 includes display 1210, one or more sensors 1212, speaker 1214, and microphone 1216. Display 1210 is configured to output visual information (e.g., a graphical user interface (GUI) generated and/or rendered by processors 1204). In some embodiments, display 1210 is a touch screen that is configured to also receive touch-based input. Display 1210 may be implemented using liquid crystal display (LCD) technology, light-emitting diode (LED) technology, organic LED (OLED) technology, organic electro luminescence (OEL) technology, or any other type of display technologies. Sensors 1212 may include any number of different types of sensors for measuring a physical quantity (e.g., temperature, force, pressure, acceleration, orientation, light, radiation, etc.). Speaker 1214 is configured to output audio information and microphone 1216 is configured to receive audio input. One of ordinary skill in the art will appreciate that I/O system 1208 may include any number of additional, fewer, and/or different components. For instance, I/O system 1208 may include a keypad or keyboard for receiving input, a port for transmitting data, receiving data and/or power, and/or communicating with another device or component, an image capture component for capturing photos and/or videos, etc.

Communication system 1218 serves as an interface for receiving data from, and transmitting data to, other devices, computer systems, and networks. For example, communication system 1218 may allow computing device 1200 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1218 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1218 may provide components configured for wired communication (e.g., Ethernet) in addition to or instead of components configured for wireless communication.

Storage system 1220 handles the storage and management of data for computing device 1200. Storage system 1220 may be implemented by one or more non-transitory machine-readable mediums that are configured to store software (e.g., programs, code modules, data constructs, instructions, etc.) and store data used for, or generated during, the execution of the software.

In this example, storage system 1220 includes operating system 1222, one or more applications 1224, I/O module 1226, and communication module 1228. Operating system 1222 includes various procedures, sets of instructions, software components and/or drivers for controlling and managing general system tasks (e.g., memory management, storage device control, power management, etc.) and facilitates communication between various hardware and software components. Operating system 1222 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1224 can include any number of different applications installed on computing device 1200. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1226 manages information received via input components (e.g., display 1210, sensors 1212, and microphone 1216) and information to be outputted via output components (e.g., display 1210 and speaker 1214). Communication module 1228 facilitates communication with other devices via communication system 1218 and includes various software components for handling data received from communication system 1218.

One of ordinary skill in the art will realize that the architecture shown in FIG. 12 is only an example architecture of computing device 1200, and that computing device 1200 may have additional or fewer components than shown, or a different configuration of components. The various components shown in FIG. 12 may be implemented in hardware, software, firmware or any combination thereof, including one or more signal processing and/or application specific integrated circuits.

Figure 13:
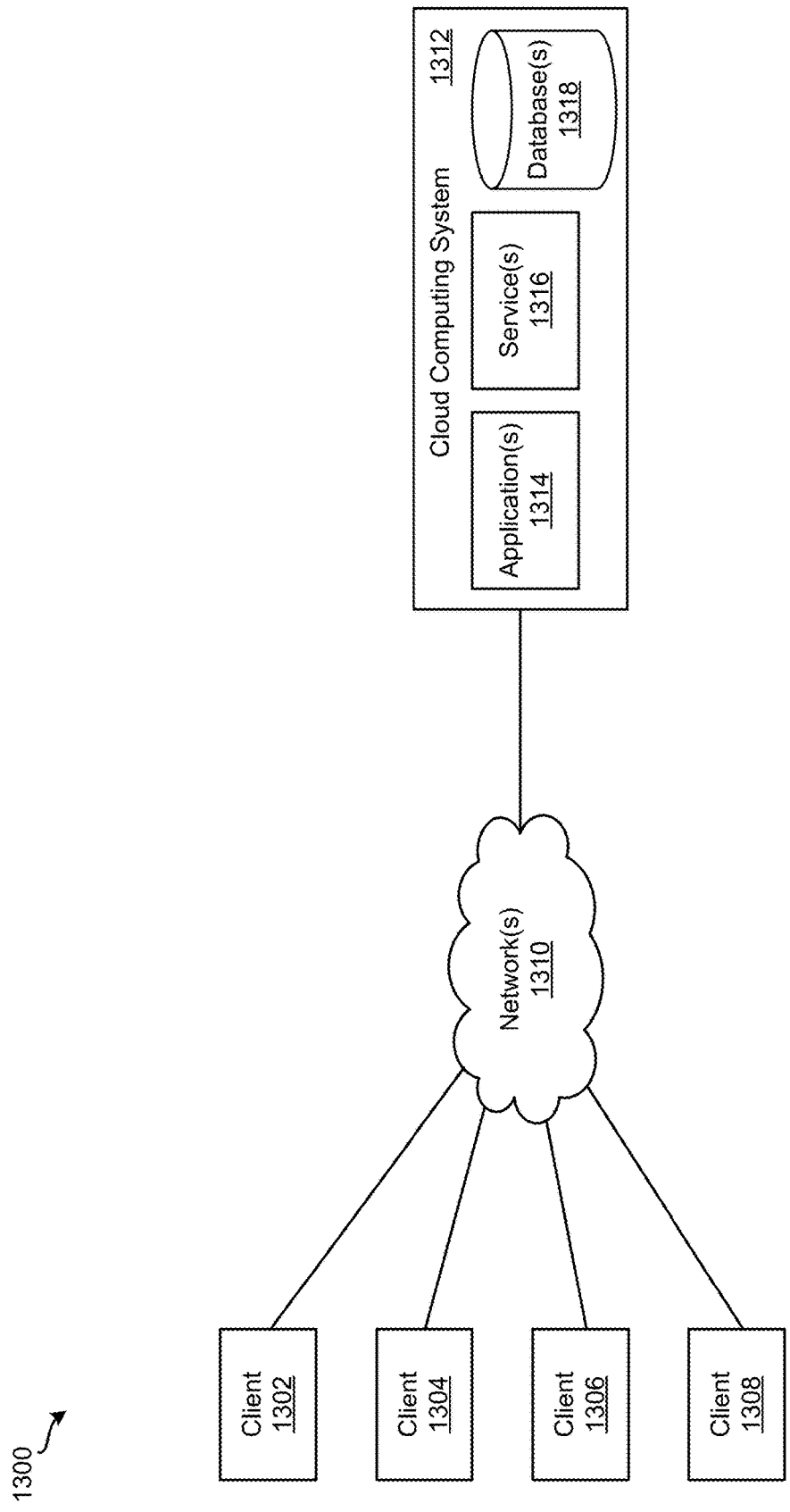
FIG. 13 illustrates an exemplary system, in which various embodiments may be implemented.

FIG. 13 illustrates an exemplary system 1300 for implementing various embodiments described above. For example, cloud computing system 1312 may be used to implement data processing system 130 and client devices 1302-1308 may be used to implement system interface device 115, smart devices 120*a-m*, and system interface devices 125*a-m*. As shown, system 1300 includes client devices 1302-1308, one or more networks 1310, and cloud computing system 1312. Cloud computing system 1312 is configured to provide resources and data to client devices 1302-1308 via networks 1310. In some embodiments, cloud computing system 1300 provides resources to any number of different users (e.g., customers, tenants, organizations, etc.). Cloud computing system 1312 may be implemented by one or more computer systems (e.g., servers), virtual machines operating on a computer system, or a combination thereof.

As shown, cloud computing system 1312 includes one or more applications 1314, one or more services 1316, and one or more databases 1318. Cloud computing system 1300 may provide applications 1314, services 1316, and databases 1318 to any number of different customers in a self-service, subscription-based, elastically scalable, reliable, highly available, and secure manner.

In some embodiments, cloud computing system 1300 may be adapted to automatically provision, manage, and track a customer's subscriptions to services offered by cloud computing system 1300. Cloud computing system 1300 may provide cloud services via different deployment models. For example, cloud services may be provided under a public cloud model in which cloud computing system 1300 is owned by an organization selling cloud services and the cloud services are made available to the general public or different industry enterprises. As another example, cloud services may be provided under a private cloud model in which cloud computing system 1300 is operated solely for a single organization and may provide cloud services for one or more entities within the organization. The cloud services may also be provided under a community cloud model in which cloud computing system 1300 and the cloud services provided by cloud computing system 1300 are shared by several organizations in a related community. The cloud services may also be provided under a hybrid cloud model, which is a combination of two or more of the aforementioned different models.

In some instances, any one of applications 1314, services 1316, and databases 1318 made available to client devices 1302-1308 via networks 1310 from cloud computing system 1300 is referred to as a "cloud service." Typically, servers and systems that make up cloud computing system 1300 are different from the on-premises servers and systems of a customer. For example, cloud computing system 1300 may host an application and a user of one of client devices 1302-1308 may order and use the application via networks 1310.

Applications 1314 may include software applications that are configured to execute on cloud computing system 1312 (e.g., a computer system or a virtual machine operating on a computer system) and be accessed, controlled, managed, etc. via client devices 1302-1308. In some embodiments, applications 1314 may include server applications and/or mid-tier applications (e.g., HTTP (hypertext transport protocol) server applications, FTP (file transfer protocol) server applications, CGI (common gateway interface) server applications, JAVA server applications, etc.). Services 1316 are software components, modules, application, etc. that are configured to execute on cloud computing system 1312 and provide functionalities to client devices 1302-1308 via networks 1310. Services 1316 may be web-based services or on-demand cloud services.

Databases 1318 are configured to store and/or manage data that is accessed by applications 1314, services 1316, and/or client devices 1302-1308. For instance, storages 155-170 may be stored in databases 1318. Databases 1318 may reside on a non-transitory storage medium local to (and/or resident in) cloud computing system 1312, in a storage-area network (SAN), on a non-transitory storage medium local located remotely from cloud computing system 1312. In some embodiments, databases 1318 may include relational databases that are managed by a relational database management system (RDBMS). Databases 1318 may be a column-oriented databases, row-oriented databases, or a combination thereof. In some embodiments, some or all of databases 1318 are in-memory databases. That is, in some such embodiments, data for databases 1318 are stored and managed in memory (e.g., random access memory (RAM)).

Client devices 1302-1308 are configured to execute and operate a client application (e.g., a web browser, a proprietary client application, etc.) that communicates with applications 1314, services 1316, and/or databases 1318 via networks 1310. This way, client devices 1302-1308 may access the various functionalities provided by applications 1314, services 1316, and databases 1318 while applications 1314, services 1316, and databases 1318 are operating (e.g., hosted) on cloud computing system 1300. Client devices 1302-1308 may be computer system 1100 or computing device 1200, as described above by reference to FIGS. 11 and 12, respectively. Although system 1300 is shown with four client devices, any number of client devices may be supported.

Networks 1310 may be any type of network configured to facilitate data communications among client devices 1302-1308 and cloud computing system 1312 using any of a variety of network protocols. Networks 1310 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving a set of sensor data from a set of sensors installed in a plurality of buildings, each sensor in the set of sensors configured to sense a physical quantity;
   based on the set of sensor data, determining that a particular event has occurred;
   based on the set of sensor data, determining a building in the plurality of buildings at which the particular event has occurred;
   based on the determined building, determining a set of subscribers associated with the building; and
   based on the determination that the particular event has occurred, sending a set of notifications to the set of subscribers.

2. The non-transitory machine-readable medium of claim 1, wherein determining that the particular event has occurred comprises:
   determining that each previous sensor data in a set of previous sensor data sensed by a sensor in the set of sensors comprises a first defined value; and
   based on the set of sensor data, determining that at least one sensor in the set of sensors changed from sensing the first defined value to sensing a second defined value.

3. The non-transitory machine-readable medium of claim 1, wherein the program further comprises a set of instructions for determining that the set of subscribers is associated with the building and generating the set of notifications.

4. The non-transitory machine-readable medium of claim 3, wherein each notification in the set of notifications includes a reference to a floor plan of the building that shows exits out of the building, locations of the set of sensors within the building, and statuses of the set of sensors.

5. The non-transitory machine-readable medium of claim 4, wherein the program further comprises sets of instructions for:
   receiving, via the reference, a request for the floor plan; and
   in response to the request, providing the floor plan to a client device of a subscriber in the set of subscribers.

6. The non-transitory machine-readable medium of claim 5, wherein the program further comprises a set of instructions for providing real-time updates to the statuses of the set of sensors.

7. The non-transitory machine-readable medium of claim 1, wherein sending the set of notifications to the set of subscribers comprises sending a notification in the set of notifications to an application operating on a client device of a subscriber in the set of subscribers.

8. A method comprising:
   receiving a set of sensor data from a set of sensors installed in a plurality of buildings, each sensor in the set of sensors configured to sense a physical quantity;
   based on the set of sensor data, determining that a particular event has occurred;
   based on the set of sensor data, determining a building in the plurality of buildings at which the particular event has occurred;
   based on the determined building, determining a set of subscribers associated with the building; and
   based on the determination that the particular event has occurred, sending a set of notifications to the set of subscribers.

9. The method of claim 8, wherein determining that the particular event has occurred comprises:
- determining that each previous sensor data in a set of previous sensor data sensed by a sensor in the set of sensors comprises a first defined value; and
- based on the set of sensor data, determining that at least one sensor in the set of sensors changed from sensing the first defined value to sensing a second defined value.

10. The method of claim 8 further comprising determining that the set of subscribers is associated with the building and generating the set of notifications.

11. The method of claim 10, wherein each notification in the set of notifications includes a reference to a floor plan of the building that shows exits out of the building, locations of the set of sensors within the building, and statuses of the set of sensors.

12. The method of claim 11 further comprising:
- receiving, via the reference, a request for the floor plan; and
- in response to the request, providing the floor plan to a client device of a subscriber in the set of subscribers.

13. The method of claim 12 further comprising providing real-time updates to the statuses of the set of sensors.

14. The method of claim 8, wherein sending the set of notifications to the set of subscribers comprises sending a notification in the set of notifications to an application operating on a client device of a subscriber in the set of subscribers.

15. A system comprising:
- a set of processing units; and
- a non-transitory machine-readable medium storing instructions that when executed by at least one processing unit in the set of processing units cause the at least one processing unit to:
- receive a set of sensor data from a set of sensors installed in a plurality of buildings, each sensor in the set of sensors configured to sense a physical quantity;
- based on the set of sensor data, determine that a particular event has occurred;
- based on the set of sensor data, determine a building in the plurality of buildings at which the particular event has occurred;
- based on the determined building, determine a set of subscribers associated with the building; and
- based on the determination that the particular event has occurred, send a set of notifications to the set of subscribers.

16. The system of claim 15, wherein determining that the particular event has occurred comprises:
- determining that each previous sensor data in a set of previous sensor data sensed by a sensor in the set of sensors comprises a first defined value; and
- based on the set of sensor data, determining that at least one sensor in the set of sensors changed from sensing the first defined value to sensing a second defined value.

17. The system of claim 15, wherein the instructions further cause the at least one processing unit to determine that the set of subscribers is associated with the building and generate the set of notifications.

18. The system of claim 17, wherein each notification in the set of notifications includes a reference to a floor plan of the building that shows exits out of the building, locations of the set of sensors within the building, and statuses of the set of sensors.

19. The system of claim 18, wherein the instructions further cause the at least one processing unit to:
- receive, via the reference, a request for the floor plan; and
- in response to the request, provide the floor plan to a client device of a subscriber in the set of subscribers.

20. The system of claim 19, wherein the instructions further cause the at least one processing unit to provide real-time updates to the statuses of the set of sensors.

* * * * *